United States Patent [19]

Stanford

[11] Patent Number: 5,090,352
[45] Date of Patent: Feb. 25, 1992

[54] BOW FOIL

[75] Inventor: Ulf H. Stanford, San Anselmo, Calif.

[73] Assignee: Corwin R. Horton, Kentfield, Calif.; a part interest

[21] Appl. No.: 284,805

[22] Filed: Dec. 13, 1988

Related U.S. Application Data

[63] Continuation-in-part of Ser. No. 17,567, Feb. 24, 1987, abandoned, which is a continuation-in-part of Ser. No. 765,791, Aug. 15, 1985, abandoned, which is a continuation-in-part of Ser. No. 232,739, filed as PCT/US87/02072, Aug. 20, 1987

[30] Foreign Application Priority Data

Feb. 16, 1988 [EP] European Pat. Off. ......... 88301271.8

[51] Int. Cl.$^5$ ............................................. B63B 1/34
[52] U.S. Cl. ................................... 114/67 A; 114/56; 114/162; 244/130
[58] Field of Search ............... 114/67 A, 67 R, 56, 114/162; 244/216, 210, 207, 209, 211, 130

[56] References Cited

U.S. PATENT DOCUMENTS

| | | | |
|---|---|---|---|
| 661,303 | 11/1900 | Briggs | 114/67 A |
| 1,661,114 | 2/1928 | Flettner | 114/63 |
| 2,366,162 | 4/1945 | Vang | 114/67 |
| 2,378,822 | 6/1945 | Barry | 114/67 |
| 3,048,137 | 8/1962 | Calehuff | 114/20 |
| 3,261,576 | 7/1966 | Valgi | 244/209 |
| 4,253,962 | 3/1981 | Thompson | 210/414 |
| 4,346,011 | 8/1982 | Brownstein | 210/748 |
| 4,377,123 | 3/1983 | Jackson | 114/126 |
| 4,525,219 | 6/1985 | Jones | 134/1 |
| 4,793,714 | 12/1988 | Gruber | 366/150 |

FOREIGN PATENT DOCUMENTS

| | | |
|---|---|---|
| 2046868 | 4/1970 | Fed. Rep. of Germany . |
| 849471 | 11/1939 | France . |
| 1312722 | 11/1962 | France . |
| 373970 | 6/1932 | United Kingdom . |

OTHER PUBLICATIONS

P. Guttelle: "The Design of Sailing Yachts", 1984, Nautical Books, MacMillan, London, GB, pp. 133–134.

Primary Examiner—Edwin L. Swinehart
Attorney, Agent, or Firm—Corwin R. Horton

[57] ABSTRACT

Vessels with improved performance capability and methods for improving such performance and foils which may be associated with a vessel for providing this improved performance capability. Additionally, a method and device for improving flow through a microporous barrier and a diffuser cell for generating gas bubbles, both of which may be associated with a vessel and/or a foil for a vessel for improving its performance. The foil is positioned forward of the vessel bowpeak with its trailing edge confronting same to impart momentum to water in the outboard direction to each side of the bowpeak while maintaining a streamline water flow, thereby reducing friction and turbulence on the wetted surface of the bow. The foil may have means of heating the surface of the leading section to reduce friction. The foil may have generators of and dispensers for friction reducing agents such as gas bubbles to distribute such agents into the path of the bow, advantageously from the trailing section of the foil. The foil may have means for drawing in water at the trailing edge to further streamline the passing flow. The foil may have a flow diverter therein to divert flow passing one side, through an opening in the foil, to the other side of the foil to create a force normal to the foil chord. This foil may be fixed at the bow or stern, with the span direction generally vertical, with the flow diverter acting as a rudder. Alternatively the foil may be pivotably mounted with a rudder stock on a vertical axis so that the entire foil pivots to act as a rudder and the flow diverter may be operated to make minor turning adjustments. The flow diverter may be used generally where "lifting" foils are employed, such as for hydrofoil vessel foils or for roll stabilizer fins mounted at the sides of the hull of a vessel. Flow through a microporous barrier is improved by impinging on the barrier ultrasonic wave energy as by positioning a piezoelectric transducer adjacent a barrier subjected to gas pressure on one side.

37 Claims, 8 Drawing Sheets

BOW FOIL

RELATED APPLICATION

This application is a continuation in part of U.S. Ser. No. 017,567 filed Feb. 24, 1987, now abandoned, which is a continuation-in-part of U.S. patent application Ser. No. 06/765,791, filed Aug. 15, 1985, which is now abandoned, which is a continuation in part of U.S. Ser. No. 232,739, filed as PCT/US87/02072, Aug. 20, 1987.

BACKGROUND OF THE INVENTION

This invention relates to navigable vessels and one of its principal objects is to provide a vessel with improved performance, particularly a vessel that creates less turbulence, has less frictional resistance, and performs better in turbulent water. The result of such improvements is increased fuel economy and/or speed, smoother operation and less structural demands on the vessel.

A vessel moving through water experiences frictional resistance at the wetted surface below the water line. As the speed of the vessel increases the turbulence created by the hull moving through the water increases rapidly until frictional forces become the practical barrier to higher speed. The energy required to propel the vessel increases correspondingly. Improving speed and efficiency are recognized as the primary goals and activities in the naval arts and decreasing frictional resistance is seen as the key to these goals.

Numerous vessel designs have been proposed for reducing resistance. Planing hulls are widely used in moderate size and smaller vessels. The planing surfaces on the hull cause the vessel to rise in the water as speed increases, thus decreasing the wetted surface area and thereby decreasing the frictional resistance and drag. This decrease can be substantial. Nevertheless, a major part of the wetted surface remains, together with its associated frictional resistance and drag.

To reduce the wetted surface to a greater extent hydrofoil have been employed. Hydrofoils, like airfoils (e.g. wings) in the aeronautical arts, are streamlined bodies which create a useful reaction ("lifting force") from a fluid stream moving relative to them. In practice hydrofoils are given a different curvature (camber) at the opposed surfaces. The resulting unbalanced profile is designed to create an efficient lifting force in the water at the selected angle of attack of the hydrofoil, i.e. the angle between the chord (straight line connecting the leading and trailing edge) of the hydrofoil and the direction of movement of the vessel. The hydrofoils are secured to the hull of the vessel and usually extend transversely amidships, at and/or below the bottom of the hull.

Hydrofoils are capable of lifting the vessel almost completely from the water, thus reducing friction and drag to that imparted by the remaining relatively minor amount of wetted surface (principally portions of the propulsion system, and the relatively hydrodynamically efficient rudder and hydrofoils). However, the formidable structural and other design problems involved in lifting an entire vessel onto hydrofoils and continuing to propel it limits their use to smaller vessels. These vessels have additional serious shortcomings. They have poor stability and are difficult to handle. They have limited service speed. Hydrofoils are highly vulnerable to floating debris. Moreover, hydrofoils, as designed and positioned, can only impart a lifting action and they serve no appreciable function of aligning flow or otherwise decreasing the friction of the water on the vessel hull when a portion of the hull is under water at slower speeds. Indeed, the foils likely add to turbulence and drag when the hull is in the water.

An extremely thin layer of water immediately next to the surface of the vessel below the water line (wetted surface) is termed the boundary layer. In this layer most of the shear forces of frictional resistance take place. Another proposal for reducing friction on a vessel is the introduction into the boundary layer of agents which will lower the friction in this layer by lowering the viscosity or by some other mechanism. Various agents have been proposed, including microscopic air or other gas bubbles, certain polymers, polysaccharides, and petroleum products. This technique appears to have potential but there are serious drawbacks and limitations in the means which have been proposed for generating, in the case of microbubbles, and the means proposed for introducing and distributing all such agents.

U.S. Pat. Nos. 661,303 and 2,378,822 each disclose an attachment for the bow of a vessel which is mounted over the apex and extends aft for a distance. Gas is discharged at holes or ports along the aft margins. At least in the case of U.S. Pat. No. 2,378,822 the forwardly facing portion of the attachment is streamlined to match to some extent the bow which it covers. This will reduce to some degree turbulence created by the attachment as compared to a totally bluff body. However, the added resistance and drag due to this structure will be substantial because elements of the attachment necessarily extend to the outside of the bow, thus creating turbulence, particularly at the necked in stern portion and at the discontinuities created by the sternward edges. Additionally as the location of the bubble release is aft of the bow apex, there is no coverage at the area which is typically the most important with regard to creation of turbulence. Nor are these attachments capable of effectively spreading bubbles appreciably outward of the boundary layer at the bow for the purpose of reducing viscosity in the sublayers. In other disclosures nozzles or perforated diffuser pipes are positioned below the waterline in advance of the bow to emit bubbles, using air supplied by connecting pipes from the vessel. Full coverage with bubbles of the field in advance of the bow is possible in this fashion. However, these systems are constituted of bluff bodies (having blunt shapes that create a rapid increase of pressure gradient downstream) which themselves cause appreciable turbulence in the water passing the bow, thus they detract significantly from any friction reduction on the hull by the emitted bubbles.

Microbubbles of diameters less than 60 microns have been found to be the most effective in reducing friction. Their generation has been achieved by diffusing air under pressure through a microporous plate, as described in the papers of Madavan, Deutsh and Merkle published in the *Journal of Fluid Mechanics* (1985), vol. 156, pp. 237-245, titled "*Measurement of local skin friction in a microbubble-modified turbulent boundary layer*" and in *Phys. Fluids* 27 (2), February 1984, entitled "*Reduction of turbulent friction by microbubbles*" and in the references cited in these papers. However the energy required for this is so great as to even exceed the energy saved through the friction reduction by the microbubbles generated.

Bow rudders have been proposed as a supplement to or replacement of a rear rudder. Conventional rudders, though, even if streamlined, create an undesirable amount of turbulence and drag in a turning mode, particularly in a bow placement. This is because the turbulence created will move along the wetted surface of the bow thus further increasing resistance and drag on the wetted surface. Additionally, pivoting at the bow the relatively large mass of the rudder decreases the stability of the vessel.

Japanese patent 55-136692 describes a pivoting front section of the bow to overcome the stability problem. However, this solution introduces its own problems, i.e. the difficulty and complexity of pivotably mounting, supporting and operating a rather massive structure. French patent 956,241 discloses fins or wings pivotably mounted on a bulb at the bow and extending aft from the pivot. The pivot axis are vertical so that pivoting of the fins will divert flow to create a turning force at the bow. Due to placement of these fins adjacent to and outwardly from the bow, they will inevitably create considerable turbulence along the hull, even if they are streamlined.

Another mode of decreasing friction is to heat the wetted surfaces of the vessel. U.S. Pat. No. 3,452,701 discloses a rudder used as a heat exchanger for cooling engine coolant by circulating the coolant through a heat exchanger coil inside the rudder to the stern of the rudder post. However, no friction reduction effect is contemplated and, if achieved would be incidental.

SUMMARY OF THE INVENTION

In accordance with the present invention, frictional resistance and turbulence and drag on a vessel may be substantially reduced and vessel performance improved by the provision of a substantially neutral foil in advance of the bow preferably with the chord of the foil substantially coincident with the vertical centerline plane of the vessel with the span of the foil extending a substantial distance below the waterline.

Economic, structural and other design demands of vessel bows unrelated to friction considerations usually dictate that the hydrodynamic characteristics of the bow are limited, if not poor, particularly in comparison with a streamlined foil. Importantly the foil utilized in accordance with this invention, may also perform other unique functions, including use as a hydrodynamically efficient and uniquely effective distributor of friction reducing agents and as a unique low turbulence, effective and stable bow rudder.

The primary action of the foil is to reduce the occurrence of frictional resistance, spray and turbulence and otherwise limit frictional drag on the wetted surface of the bow. While Applicant does not wish to be bound by any particular theory, it is believed that as the foil moves through the water it "spreads" the water in a uniform or laminar manner and the outward momentum imparted continues as the water reaches the bow, thus decreasing the spreading action required by and reducing the pressure on the less hydrodynamically efficient bow. The foil will allow a shorter bow without sacrificing beam and speed. In effect, the foil acts as an extension of the bow, but at the same time, with only a small limitation on turning ability as compared to a vessel with an extended bow of equivalent performance.

In this invention the foil may embody a rudder function. The forward section of the foil may be made pivotable on an axis in the span direction of the foil. The pivotable section is pivoted from its normal neutral foil position for a turning movement. This has the effect of changing the profile of the foil, unbalancing it so as to create "lift" or turning force in the desired turn direction. Creating turning force in this fashion, as contrasted with changing the angle of attack of the entire foil (by pivoting the entire foil as with a rudder), creates significantly less turbulence and drag. Hence it is not only hydrodynamically more efficient as a rudder, per se, but the lower turbulence imparted by it to the water moving to the wetted surface of the bow results in less frictional resistance drag at the bow as contrasted to that which would be caused by a conventional rudder. Additionally, due to the smaller frictional resistance and drag potential with this design, strength, mounting and turning requirements are markedly less.

A yet more efficient turning or lifting foil is provided in this invention (either for use in the rudder embodiment of the bow foil or for any other lifting or turning foil use. This lifting or turning foil will preferably have a neutral profile if used as a bow foil or in a rudder located in the stern. For other uses, such as in a stabilizer wing, the foil may desirably be unbalanced with a camber on each side designed to provide the desired lift characteristics. The essential feature of this foil is an opening in the foil through its entire width (thickness) across the chord, intermediate the leading and trailing edge and extending along the span, which has an associated flow diverter that is extendable into the flow stream on one side of the foil to divert water flow through the opening to the other side of the foil. The flow diverter may also act as a closure. Preferably the flow diverter is pivotably mounted on an axis generally in the span direction. The flow diverter pivots shut to close the opening and pivots open to project outward of the surface of the foil and partially into the flow stream adjacent the foil surface on one or both sides to divert flow through the opening to the other side. The flow diverter thereby causes a differential pressure or force on one side of the foil which to a large degree approaches the magnitude of force that would be created if the entire foil were pivoted and with significantly less turbulence. Thus, this foil may fulfill the function of a rudder without requiring the entire foil or wing to pivot, which capability would require a much stronger and more complex mounting and pivoting mechanism.

As another part of this invention the foil may embody means for generating and/or distributing friction reducing agents such as microbubbles, certain polymers, polysaccharides, petroleum products and, in one embodiment, heated water. Agents to be distributed into the path of the bow may be advantageously discharged through ports, nozzles or other appropriate openings at the surface of the foil aft of its widemost point. As the pressure created by the water flow is less at the aft portions, introduction of the agents is easier and there is less disturbance of the flow. Importantly as well, the agents may thereby introduced into the streamlined flow through which the bow will move and this may be accomplished in a more uniform and precise manner. The placement of the foil permits distribution of the agents not only to the boundary layer at the bow but also to the entire field confronting the bow, thus providing maximum effect.

In the embodiment where heat is introduced, preferably the surface of the forward segment of the foil are heated. In this manner the heat acts not only to reduce water viscosity and hence the friction at the bow by warming the water flowing to it, but friction is reduced as well at the foil making it even more efficient hydrodynamically.

In the case of microbubbles, an efficient and effective system is provided by virtue of the foil for both their generation and distribution. Microporous diffusers or other microbubble generators may be situated at the surface (desirably flush mounted to avoid turbulence) or in the interior of the foil or at a remote location and piped to the foil.

Advantageously, microbubbles may be generated locally in a unique and energy efficient manner. It has been discovered that imparting high frequency energy waves, preferably ultrasonic energy, to a microporous diffuser markedly increases the throughput of gas at the same pressure gradient. A microbubble generating cell is provided having a gas supply under pressure at one side of a microporous plate with the other side of the plate exposed to the water stream and having an ultrasonic generator, preferably located adjacent the microporous plate on the gas pressurized side.

SPECIFIC DESCRIPTION OF THE INVENTION

The foil, as utilized in accordance with this invention, is desirably configured to minimize turbulence and friction both by streamlining of its shape and by providing it with a smooth and polished surface. The foil, desirably, is neutral. That is, configured so as to exert no substantial net force in either direction perpendicular to the direction of movement of the foil in water when its chord extends in the direction of movement. Preferably, the camber or contour of the foil on one side of the chord substantially mirrors that on the other so that the foil is balanced or symmetrical relative to its chord. In its simplest form, for small vessels, the foil may be a thin flat plate rounded at the leading and trailing edges. Generally, however, the foil will vary in thickness throughout its chord direction, in as streamlined fashion. The leading section of the foil extends forward along the chord from the thickest point of the foil to the leading edge. The trailing section of the foil extends along the chord from the thickest point of the foil to the trailing edge.

In general, the foil is desirably big enough in chord length and in thickness, relative to the size of the vessel to impart sufficient outward momentum to the water at service speed to materially decrease the friction on the vessel hull. The thickness of the foil (at its thickest point) in relationship to its length is desirably 1% to 40% of the chord length, with the thickest point located aft of the leading edge a distance equal to 20% to 80% of the chord length and preferably 20% to 60%. In relation to the vessel, the principal variables influencing the choice of thickness of the foil include the design speed of the vessel, its beam and draft and the distance between the bow and the foil. For a slow vessel with a beam of twenty feet or more and a draft greater than one foot, a foil thickness of two inches or greater will usually be more effective. And, for very large, slow vessels, foil thicknesses one to five feet or even as large as fifteen feet may provide better performance. Foils for faster vessel, i.e. above 30 knots design speed, may be relatively thinner, for small vessels even as thin as may be practicable, e.g. one half inch up to two to five inches. As beam and length increase, foil thicknesses of up to sixty inches may be preferred. In general, for faster vessels, the "angle of attack" of the foil (the relative sharpness of its leading edge) is desirably narrower.

The thickness of the foil is preferably the same over its underwater span length. However, the thickness in the span direction may vary, if desired, usually with maximum thickness at the waterline. Desirably, the thickness over the underwater span varies, overall, less than 100%, preferably less than 50%, and most preferably less than 20%.

The chord length of the foil may vary over its span below the waterline, becoming generally narrower towards one end or the other, usually narrower towards the keel line. However, for maximum effect, the chord length variation over the underwater length is desirably less than 100% and preferably less than 50%, most preferably less than 20%.

The foil is desirably positioned on the vertical longitudinal center plane of the vessel, with its chord coincident with such vertical center plane. The span of the foil extends a substantial distance below the waterline of the vessel, and desirably, from the waterline down to the keel line, or to the bulb, if the vessel is equipped with a bulb. In this context, the waterline is the highest vertical point on the bow that the water reaches when the vessel is fully loaded, moving at design speed in a heavy sea.

Along its span below the waterline the trailing edge of the foil confronts and is spaced forwardly of the bowpeak at any point horizontally adjacent thereof. The term "bowpeak" is intended to mean the foremost point of the vessel at any given elevation above or below the waterline. In most cases at most or all elevations this will be the leading edge of the bow but it can also be other structure, such as a bulb, keel or the like. For best performance the foil is positioned with its trailing edge parallel to the bowpeak throughout its length below the waterline. However, if desired, the foil may be at a different angle to the bowpeak, for example, vertical. As shown in each of FIGS. 1, 9, 10 and 11, the foil is positioned with a forward rake, i.e. inclined forwardly in the upward direction.

The spacing of the foil from the bowpeak is important for optimizing the benefits of this invention. The most appropriate spacing will vary with a number of factors, with the distance generally increasing with the service or design speed and with the beam of the vessel and with the thickness and chord length of the foil, and vice versa. While the spacing may thus vary, the foil should be positioned close enough to the bowpeak that, at the vessel's design speed, a useful amount of outward momentum the foil imparts to the water remains when that water passes the vessel's bow.

Under some conditions, particularly at lower speeds for a vessel with a sharp bowline which is confronted by a foil trailing section which is also quite sharp or thin, enhanced performance may be obtained even with the trailing edge of the foil directly against the bowpeak. However, usually the trailing edge of the foil should be spaced from the bowpeak in order to obtain the full benefits of the invention. That spacing may vary not only in accordance with the factors already mentioned above, but also with the degree of sharpness of the bow, the sharpness of the trailing section of the foil and other factors influencing the degree of friction and turbulence that is generated at the region of the foil trailing edge and the bowpeak. However, the bowpeak and the foil trailing edge should desirably be spaced apart a distance such that a continuous streamline condition is maintained in the water as it passes adjacent the foil trailing edge and the bow. The more full or bluff the bow or the trailing section of the foil, the wider the spacing that is needed therebetween to maintain streamline flow in the adjacent region.

In practice, the foil is desirably spaced from the bowpeak at any horizontal point at a horizontal distance equal to or greater than the maximum thickness of the foil (measured from the trailing edge of the foil). For slower vessels (up to 30 knots design speed) a spacing of between 2% and 25% of the vessel beam width is desirable and, for higher speed vessels, a spacing of between 1% and 30% of beam width. If the trailing edge of the foil is relatively thick, which it may be for slower and smaller vessels, the spacing is desirably narrower, preferably less than the foil thickness.

For larger vessels, to better protect the foil from collision damage, the foil may be positioned at or aft of the vessel's forepeak at the waterline, as will be exemplified in to the embodiment of FIGS. 1 through 8 of the drawings.

Figure 3:
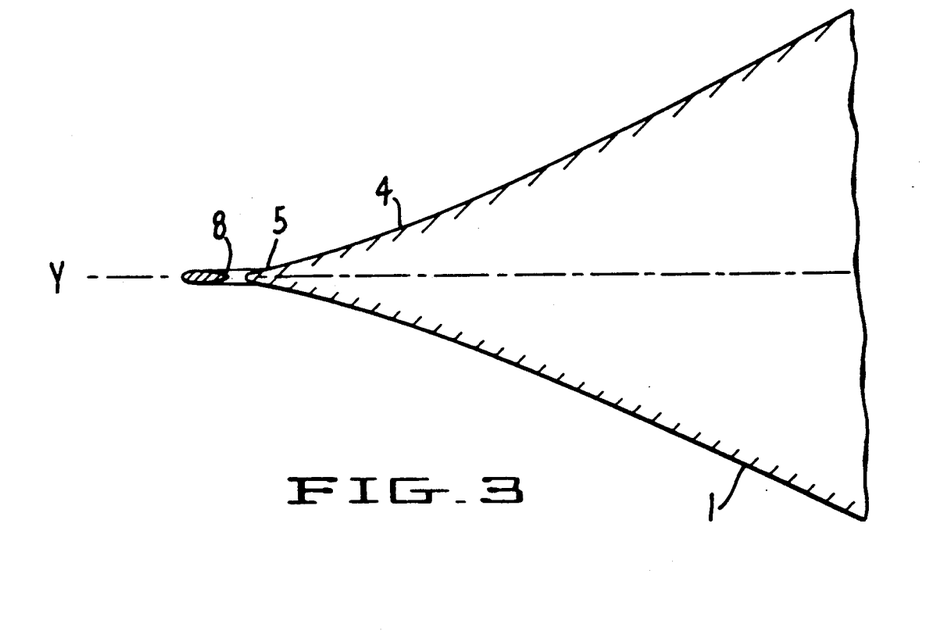
FIG. 3 is a cross-sectional view of the bow of FIG. 1 taken upwardly along lines 3—3.
Figure 4:
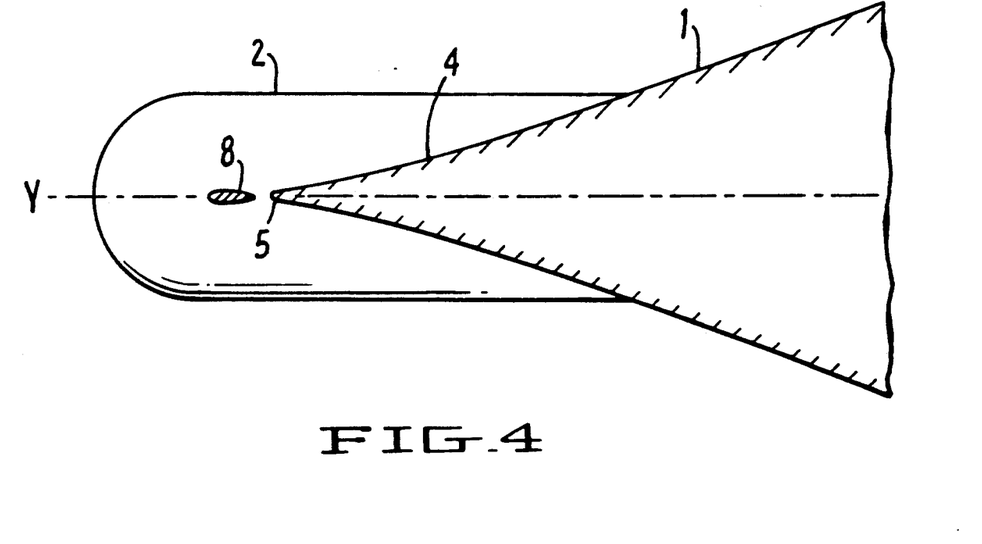
FIG. 4 is an overhead cross-sectional view of the bow of FIG. 1 taken along lines 4—4.
Figure 5:
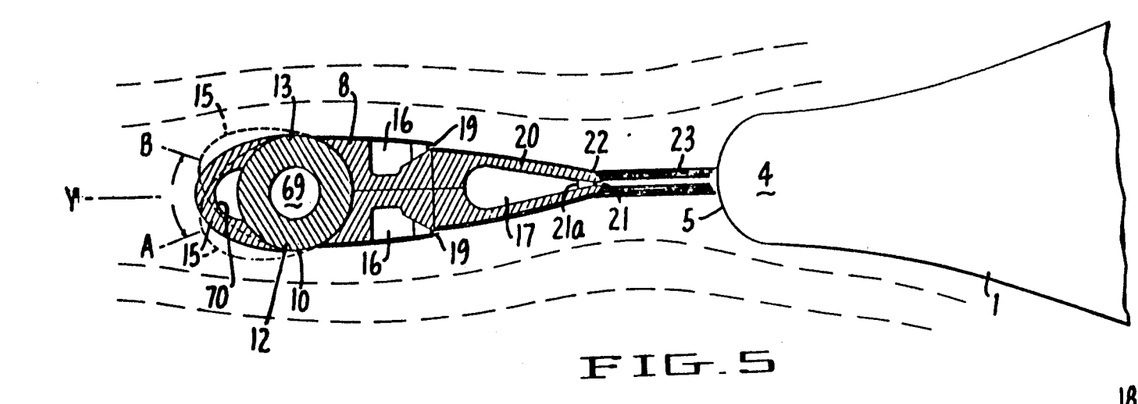
FIG. 5 is the forward portion of the bow shown in FIG. 4, enlarged, without showing the bulb.
Figure 6:
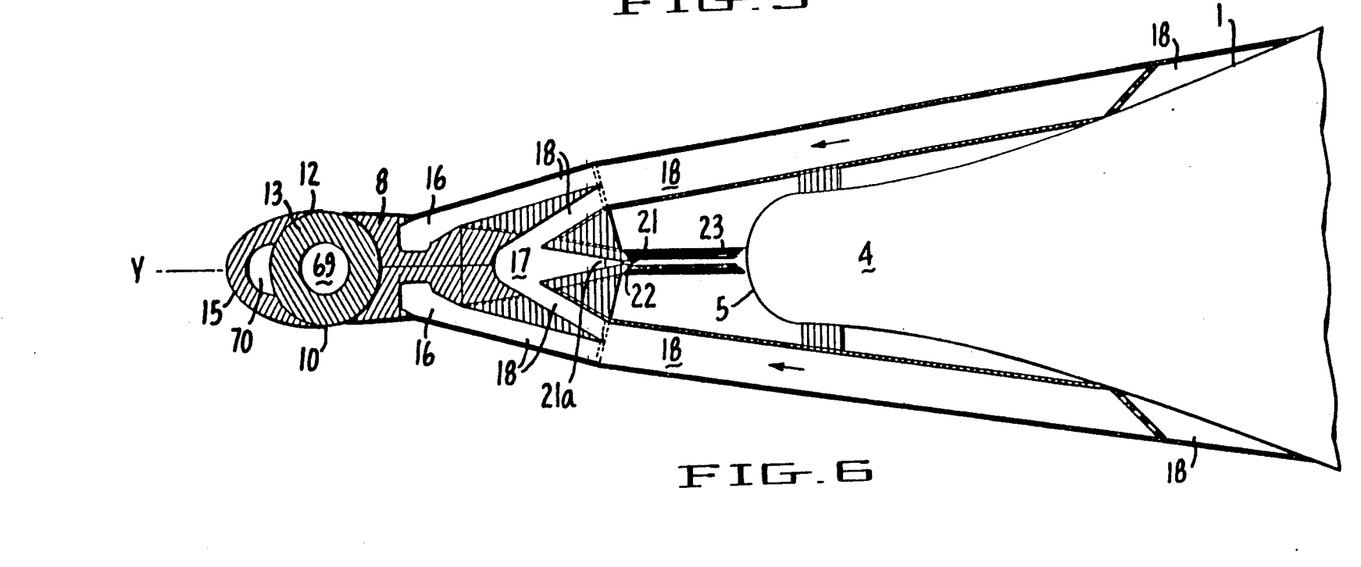
FIG. 6 is an enlargement of the view of the bow of FIG. 3.
Figure 7:
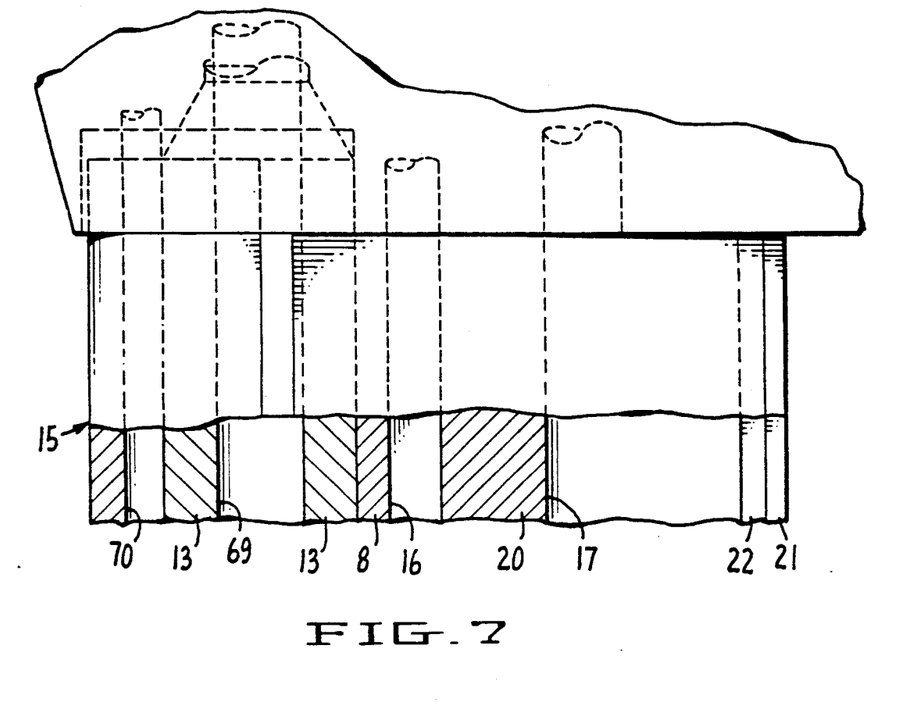
FIG. 7 is an enlarged cutaway view of the upper forward portion of the bow shown in FIG. 1.
Figure 8:
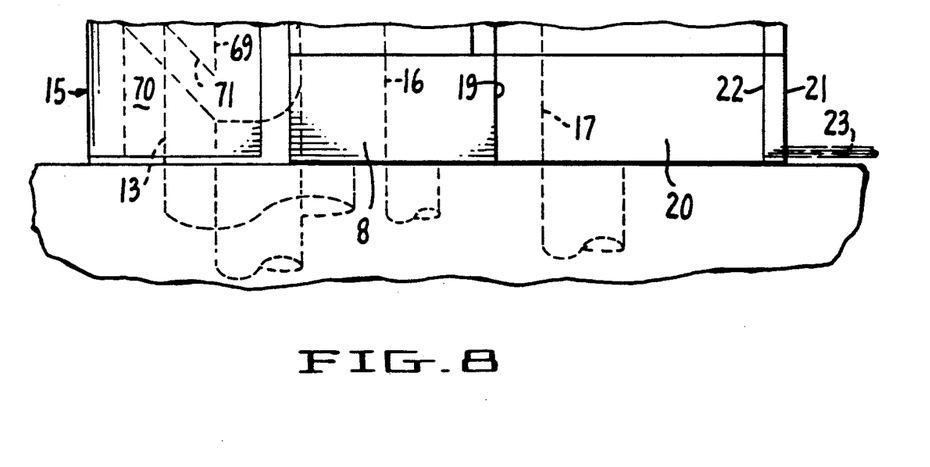
FIG. 8 is an enlarged cutaway of the upper and lower forward portions of the bow shown in FIG. 1.
Figures 9, 10, 11:
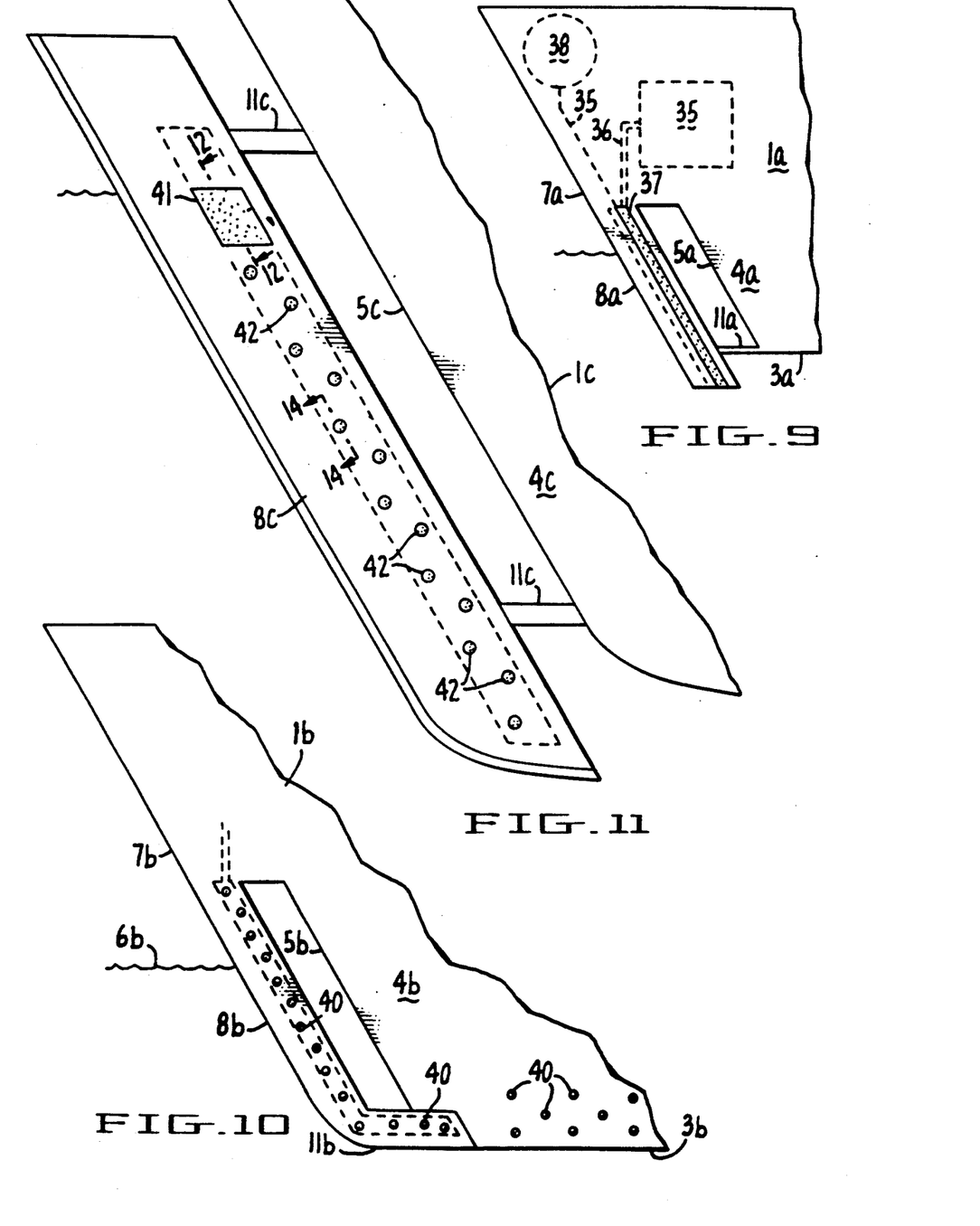
FIG. 9 is an elevational view of the bow of a vessel illustrating a different embodiment of the invention.
FIG. 10 is an elevational view of the bow of a vessel illustrating yet a different embodiment of the invention.
FIG. 11 is a breakaway elevational view of the lower portion of a vessel bow illustrating yet another embodiment of the invention.

With reference to the drawings, FIG. 1 through FIG. 8 illustrate an embodiment of the invention applied to very large vessel having an overall length of 920 feet, a beam of 136 feet at the waterline and a design speed of 30 knots. Vessel 1 has a conventional bulb 2 located adjacent the keel line 3 of bow 4. The leading edge, or bowpeak, 4 of bow 3 below the waterline 6 extends upwardly from bulb 2 to forepeak 7 above the waterline 6, with a total span of 40 feet. Secured to bulb 2 is foil 8 which extends upwardly therefrom, generally parallel to bowpeak 5 below the waterline, and spaced forewardly thereof, with a gap therebetween of 20 inches, which is equal to about 42% of the chord distance of the foil (4 feet). As better seen in FIG. 3 through FIG. 6, the chord of foil 8 lies along the vertical centerline plane Y of the vessel. At its upper end foil 8 is secured to forepeak 7 adjacent the forepeak leading edge 9. As shown in FIG. 5, the thickest point of the foil, 10.5 inches, occurs at 10, which is a distance from the leading edge of the foil equal to 28% of the chord length.

Where the foil of this invention is employed with a vessel which does not have a bulb at the bow, the foil may extend down to and, optionally, a distance therebelow, in various configurations as exemplified in FIGS. 9-11. In FIG. 9, foil 8a extends from forepeak 7a of vessel 1a parallel to the bowpeak, as in the embodiment of FIG. 1, but foil 8a extends down to keel line 3a and for a short distance therebelow. Foil 8a is secured to bow 4a at its lower end by strut 11a at the keel line. Such a foil extension would be particularly useful for a vessel having structure extending below the keel line, e.g. a centerboard, keel or the like. Alternatively a separate foil may be mounted directly in advance of such structure, either connected to and supported by that structure of by the keel, above.

In FIG. 10 Foil 8b is similar to foil 8a of FIG. 9, except that it ends at the keel line and connects to bow 4b at that point by a gently curved and streamlined connecting plate 11b.

In FIG. 11, foil 8c is connected at both ends to the bow peak by struts 11c and extends foreward of bow peak 7c throughout the foil span. This embodiment may be more suitable for smaller vessels, due to its simplicity and ease of retrofit. Struts 11c may be provided with an internal channel for conduits connecting vessel 1c with foil 8c for utilities (e.g. compressed air and electricity) for servicing the foil for functions described below.

For other applications, such as a submarine which may have a generally rounded bow or a bow which extends more horizontally than vertically, the foil may be positioned vertically or, in the latter instance, a horizontal foil may be more effective. For multihull vessels, such as a catamaran, a foil may be attached to each hull in a similar fashion as described for a monohull vessel.

If desired, for increased effect, two or more foils may be used in tandem, each with its chord disposed on the vertical centerline plane of the vessel, one in front of the other. For example, with the foil system depicted in FIGS. 1–8, a second foil, having the same configuration size and span as foil 8, may be positioned foreward thereof, spaced therefrom the same distance as the spacing between bowpeak 5 and foil 8. The second foil may be spaced from and secured to foil 8 by struts, similar to those depicted in FIG. 11.

Apart from its uses in accordance with this invention for dispensing friction reducing agents, the effectiveness of the bow foil in reducing friction is materially greater when the bow of the vessel is substantially tapered, desirably to at least to a semicircular profile forward, as described above in reference to the bow of a submarine, in contrast to a blunt or bluff bow. Preferably the bow is tapered to a substantially sharper or more angular profile, generally describing an acute angle in horizontal crosssection, as illustrated in FIGS. 3 and 4.

Another feature of this invention concerns the employment of the bow foil as a rudder. As will be described, the leading section of the foil may be mounted to pivot on an axis extending in the span direction to form an angle with the trailing section 20 of the foil, thus, in effect, providing the foil with a variable camber. Pivoting the leading section about this axis from its normal balanced position unbalances the foil to create a turning force in the direction the leading section is pivoted, as the foil moves through the water.

Referring to FIGS. 5–8, leading section 12 of foil 8 comprises rudder stock 13 which is mounted for pivoting at its upper end in casing 14 and is similarly mounted at its lower end (not shown). A rudder turning mechanism or machine (not shown), is provided in forepeak 7 where it engages the upper end of rudder stock 13. Foreward of rudder stock 13 and fixed thereto is rudder 15 which also forms the leading edge of foil 8. For turning movements rudder stock 13 is pivoted, and with it rudder 15, from the neutral position to the desired turn direction, either left or right, as shown in dotted outline at A and B.

Yet another feature of this invention, for providing a rudder function and for other uses, is a foil pressure regulator. The foil pressure regulator may be used to impart a rudder function to the bow foil of this invention in addition to its general utility for other foil applications. As employed with a neutral foil, as in the case of either a bow or stern foil (or rudder), the pressure regulator acts to unbalance the pressure on the sides of the foil moving through the water, thereby imparting a turning or lifting force to the foil.

When utilized with an unbalanced or lifting foil (or with a balanced foil moving through the water at an angle of attack relative to its direction of movement), the foil pressure regulator is utilized to adjust the lifting or turning force of the foil, increasing or decreasing that force as may be desired. This has particular application to foils utilized as 'wings', i.e. the hydrofoils of hydrofoil vessels, to adjust the lifting force they impart to raise or lower the vessel hull from the water. The regulator also has particular application to roll stabilizer foils or fins which, conventionally are mounted at either side of the hull at or above the keel line with an adjustable angle of attack relative to the horizontal plane to provide upward or downward force. To either complement or replace the angle of attack adjustment, the foil pressure regulator may be employed to impart a portion or all of such force.

The foil pressure regulator constitutes a flow diverter which cooperates with an opening across the chord of the foil intermediate the leading and trailing edge to divert the flow of water passing along one surface of the foil through the opening and thus to the other side of the foil. When the diverter is operative to divert flow, its leading edge extends into the path of water flow to one side of the foil. When the diverter is inactivated or in neutral position, it is retracted from its extended position, preferably to a position where it partially or completely blocks or closes the opening. Desirably the major dimension of the opening and of the diverter extends generally in the span direction and thus, in operation, generally perpendicular to the flow across the foil.

Figures 18, 19, 20, 21, 22, 23:
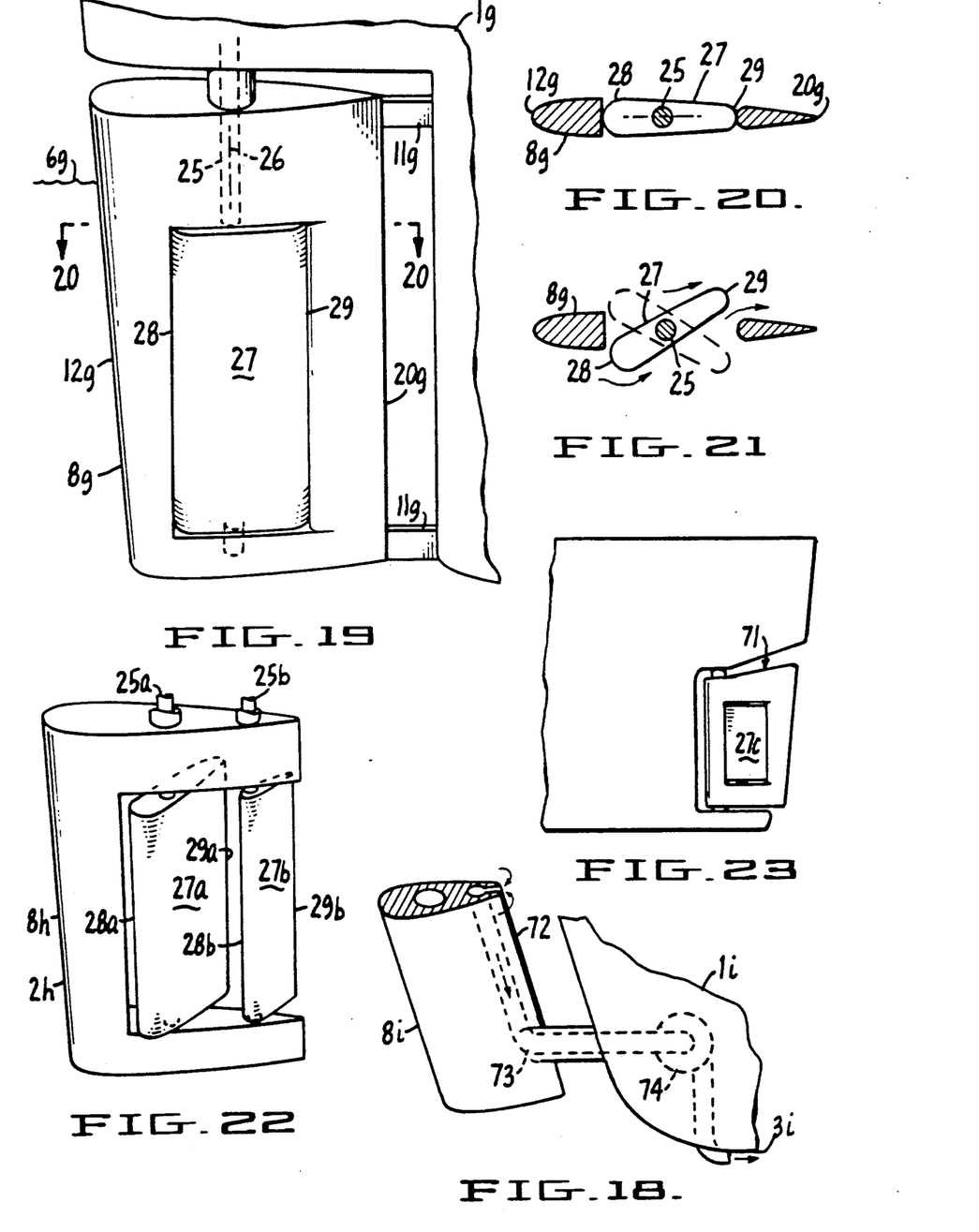
FIG. 18 is an isometric view of a foil in accordance with this invention having the capability to draw water in at the trailing edge.
FIG. 19 is an isometric view of a foil having a foil pressure regulator therein in accordance with this invention which provides a rudder capability thereto.
FIG. 20 is a cross-sectional view through the foil of FIG. 19 taken along lines 20—20.
FIG. 21 is the same view as in FIG. 20 but showing the flow diverter in actuated positions.
FIG. 22 is an isometric view of a foil having a foil pressure regulator in tandem with a trailing flap.
FIG. 23 is an elevational view of an aft rudder containing a flow diverter in accordance with this invention.

Referring to FIGS. 19–21, foil 8g is secured to bow 4g of vessel 1g by struts 11g and extends from above the waterline 6g to keel line 3g. Flow diverter 27 is pivotably mounted in, and acts as a butterfly valve or closure for, a rectangular opening O in foil 8g, as better seen in FIGS. 20 and 21. Diverter 27 is secured along its vertical axis to axle 25 which, in turn, is secured along the centerline 26 of foil 8g for rotation about centerline 26. Axle 25 extends upwardly through and beyond foil 8g, where it is connected to an actuator drive (not shown) for pivoting diverter 27 between a closed position and actuated positions on either side of foil 8g.

As seen in FIG. 20, the centerline of axle 25, and the centerline of diverter 27 when it is in the closed position are coincident with the chord 26 of foil 8g. In this embodiment, the length of leading section 28 of diverter 27 (from the axle pivot point to the leading edge) is approximately 40% of the entire chord length of diverter 27. Diverter 27 desirably has a neutral or symmetrical profile about its chord, with its maximum thickness at or foreward of axle 25. It is also desirable that the sides of diverter 27 generally follow and maintain the camber of foil 8g, as shown, when in the neutral or inoperative position. The leading and trailing edges of diverter 27 desirably are more rounded or streamlined for slow speed applications and sharper for higher speeds.

Referring to FIG. 21, diverter 27 may be pivoted from the closed position, as shown in FIG. 20, in either direction to move leading section 28 outwardly at least partially beyond the surface of foil 8g to expose passage or opening O, as indicated at 30. Leading section 28, thusly extended into the path of water flow adjacent foil 8g, will divert such flow through opening O at 30 to the other side of diverter 27 and of foil 8g, thereby creating a force normal to the foil chord, in the direction which diverter leading section 28 has been pivoted.

At the same time, trailing section 29 pivots outwardly at least partially beyond the opposite surface of foil 8g. The trailing section 29, thus extended, in addition to diverting flow to the other side, acts to camber the foil to create an additional force normal to the foil chord also in the direction in which leading section 28 has been pivoted.

Another embodiment of the flow diverter is shown in FIG. 22 in which a trailing flap 27b with a leading edge 28b and a trailing edge 29b constitutes a trailing section of foil 8h which is pivotable on axle 25b to supplement, when pivoted outwardly of the foil, the flow diverting effect of diverter 27a which pivots on axle 25a.

Another embodiment of the flow diverter foil is shown in FIG. 23, in which the foil constitutes an aft rudder 71 mounted on a rudder stock for pivoting on a vertical axis. With flow diverter 27c in a closed position, rudder 71 may be operated like a conventional rudder. When rudder 71 is maintained in a stationary position, flow diverter 27c may be pivoted (by an actuator not shown) to an actuated position to impart a turning force on the rudder which, while somewhat smaller than the force obtained by turning the entire rudder, is more efficient because of the significantly lower drag and friction that it creates.

Another important embodiment of the flow diverter foil is in a roll stabilizer fin. Active systems for dampening the roll of a vessel utilize fins (foils which can create lift to either side) mounted at the sides of the hull between the keel line and the waterline with their span direction extending generally outboard of the hull. These fins conventionally pivot on an axis in the span direction to change their angle of attack to create upward and downward forces in opposition to the roll direction. When utilizing flow diverters of this invention, the fins may also be pivotable, however, advantageously, they may be neutral or balanced foils fixedly mounted on the hull with their chords generally horizontal (with little or no angle of attack). Preferably the flow diverter for these foils is of the type illustrated in FIG. 19 with the major dimension of the opening and the pivot axis extending outwardly for the hull in the span direction. The conventional controls for roll stabilizer fins may be applied to the flow diverters in these fixed foils so that in response to the roll of the vessel the axles of the flow diverters will be pivoted to create an upward and a downward force, respectively, to counter the roll.

In other embodiments of the foil flow diverter, the diverter may be provided with a shorter trailing section or even none at all, in this case with its pivot point at the trailing edge of the opening. Alternatively, the pivot point may be entirely at the leading edge of the opening so that there is no activator trailing section. Also there may be a closure for the opening separate from the diverter extendible into the flow, such as a sliding plate that slides into the open from a retracted position inside the foil. Additionally, as desired, the pressure regulator may be smaller or larger in relation to the size of the foil, or closer to or further from the leading or trailing edge of the foil, but, for maximum effect, the opening is located with its trailing edge forward of the foil trailing edge a distance of at least 20% of the foil chord length adjacent the opening.

It can be seen that the foil pressure regulator has a multiplier effect as compared to a rudder or wing, per se. Diversion of flow from one side to the other of the foil surface creates a differential pressure not only across the surface of the diverter but across the foil surface, as well.

Another important feature of this invention is the employment of the bow foil for generating and for dispensing friction reducing agents. A particular advantage of the bow foil for this purpose is its capability of distributing such agent in advance of the bow to the regions where these agents provide maximum benefit and in a relatively more precise and uniform manner. Additionally, the trailing section of the foil provides an advantageous zone for release of such agents as the dynamic pressure of the water on the foil surfaces in this region are relatively low and the water flow is substantially laminar, with significantly less spray.

A number of alternatives are available for generating, in the case of gas bubbles, and for dispensing all friction reducing agents from the bow foil. In general, such agents may be prepared or stored in the vessel and piped to the foil for distribution and release or, in the case of gas bubbles, they may be generated (using supplied gas) in or at the surfaces of the foil.

Figure 1:
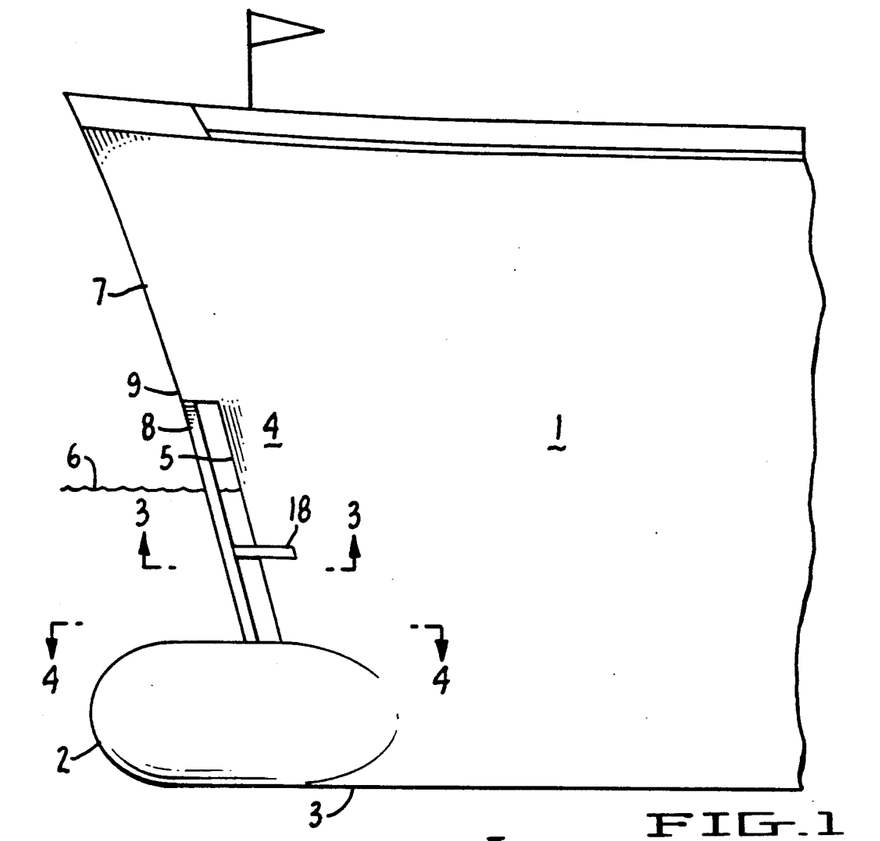
FIG. 1 is a elevational view the forward portion of a vessel embodying the present invention, taken from the port side.
Figure 2:
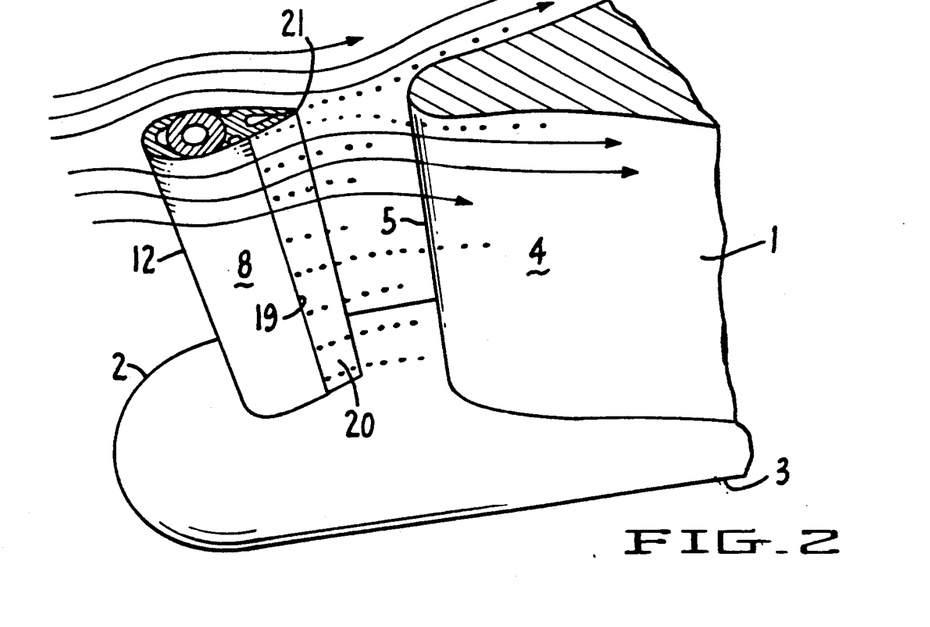
FIG. 2 is an enlarged sectional view taken along lines 4—4, of the lower portion of the bow of the FIG. 1 shown isometrically.

Referring again to FIGS. 1-8, in this embodiment friction reducing agents are prepared or generated in a water system in bow 4. The water containing such agents, e.g. bubbles in suspension, is piped to foil 8 and emitted at orifices at the sides and trailing edge of the trailing section of the foil. Specifically, as shown in FIGS. 5-8, vertical side channels 16 and trailing channel 17 are provided in the interior of foil 8 which are supplied with friction reducing agents from vessel 1 through conduits from forepeak 7 and bulb 2 (not shown) connecting with these channels 16 and 17 at both the top and bottom ends of foil 8. Additionally, to insure the desired distribution intermediate supply conduits, generally indicated at 18 in FIG. 1, are provided. Conduits 18 are shown in more detail in FIG. 6 together with their connections to channels 16 and channel 17. Supply conduits extend to vessel 1 and they connect to the interior thereof to a friction reducing agent supply system (not shown).

Vertical slit outlets 19 are disposed along each side of trailing section 20 and they are each in communication along their length with channel 16 on their respective sides to provide outlets for releasing friction reducing agents from their respective channel 16 into the water flowing past. Similarly vertical slit outlet 21 is disposed along trailing edge 22 and is reinforced with stabilizing wing w. Slit 21 is in communication with channel 17 for releasing friction reducing agents from channel 17 into the water flow at the trailing edge. Optionally, shrouds 23 of flexible material such as film or laminar fiberglass may be attached to trailing edge 22 to trail in the water flow stream to guide the released friction reducing agents to the bow peak (shown only in FIGS. 5 and 6).

Alternatively, gas bubbles may be generated internally in the foil or at its surfaces for example by utilizing microporous barriers such as diffuser plates. Metal plates prepared by sintering powdered metal and chemically etching out the pores therein may be used.

However, it has been discovered that fiber metal mats, when appropriately designed and used in accordance with this invention, are uniquely suitable for production of a high volume of microbubbles at surprisingly modest pressures and energy consumption.

For this invention the fibers utilized in such mats are of ductile, strong, corrosion-resistant metals, including stainless steel, nickel alloys, such as Inconel 600 and Hastalloy C, and bronze. The diameter of the fibers employed may be between 2 and 80 microns, and preferably between 5 and 40 microns. In manufacture, the mats are desirably pressed to a density above 30% and below 70% and are preferably in the density range between 40 and 60 percent. In general, the mats or plates will have an average pore size as low as 5 microns, but more typically between 10 and 100 microns and preferably below 50 microns. The desired pore size may be achieved by appropriate selection of fiber diameter, the amount of fibers per unit area of the mat, and the amount of compression (and hence density and thickness of the mat).

The air permeability of such mats is desirably greater than 50 and preferably greater than 100 cubic feet per hour per inch of water of pressure differential between the sides thereof (or, expressed in metric, one-half and one cubic meter per hour per centimeter of water pressure differential, respectively), tested at standard conditions, i.e. 20 degrees centrigrade, one atmosphere pressure and with a test velocity of 2000 feet (609.6 meters) per hour. The desired permeability, like the desired pore size, may be obtained by appropriate selection of fiber diameter and adjustment of mat thickness and density.

Mats produced in this manner have a surprising uniformity of pore size, i.e. a narrow range of pore size distribution. Average pore size can be measured satisfactorily for purposes of this invention by various conventional procedures that provide an approximation thereof, including measurement by the mercury porisometer or by particle entrapment tests in which fluids containing particles of known size are passed through the mat and the extend of particle retention in the pores is determined.

The thickness of the mat is desirably less than 50 millimeters and, for more efficient operation, less than 40 mm. Mats of a thickness down to about 1.5 mm may be employed where the unsupported areas of the mat are less than 1 square centimeter and preferably are 3 mm or thicker where the unsupported area of the mat is greater. Support structure may be provided, preferably on the inboard side of the mat, to give additional structural strength, such as a perforated plate, woven wire screens or an open honeycomb section ((with the cell walls perpendicular to the mat surface), abutted against the mat inner surface and desirably glued or fused thereto.

The choice of thickness and size of the microporous plates will vary with the conditions particular application. The most preferred fiber metal mat is consists of 25 micron diameter bronze fibers compressed to a density of 45-50% (of the solid metal) with a thickness of 3 millimeters and having a average pore size of 30 microns (with a size distribution of plus or minus 8 microns). This material is available from Brunswick Corporation under the trademark Feltmetal. The choice of thickness and size of the diffuser plates will vary with the conditions particular application. In general, the diffuser plates will have an average pore size of between 10 and 100 microns and preferably below 50 microns.

These plates are mounted at the outside surface, or at an internal location of the foil in water communication with the outside, and provided with a pressurized gas chamber on the back (opposite) side. The pressurized gas flowing through the diffuser plate into the water forms bubbles, the size of which may be adjusted by varying the gas pressure, the average pore size of the diffuser plate and/or the flow rate of the water passing the diffuser plate. Gas bubbles with an average diameter below 50 micron are desirable for effective results, and an average diameter of 40 micron or less is preferred. Additional information and guidance on bubble generation may be found in the literature, including the Madavan et al. articles previously cited.

Figures 15, 16, 17:
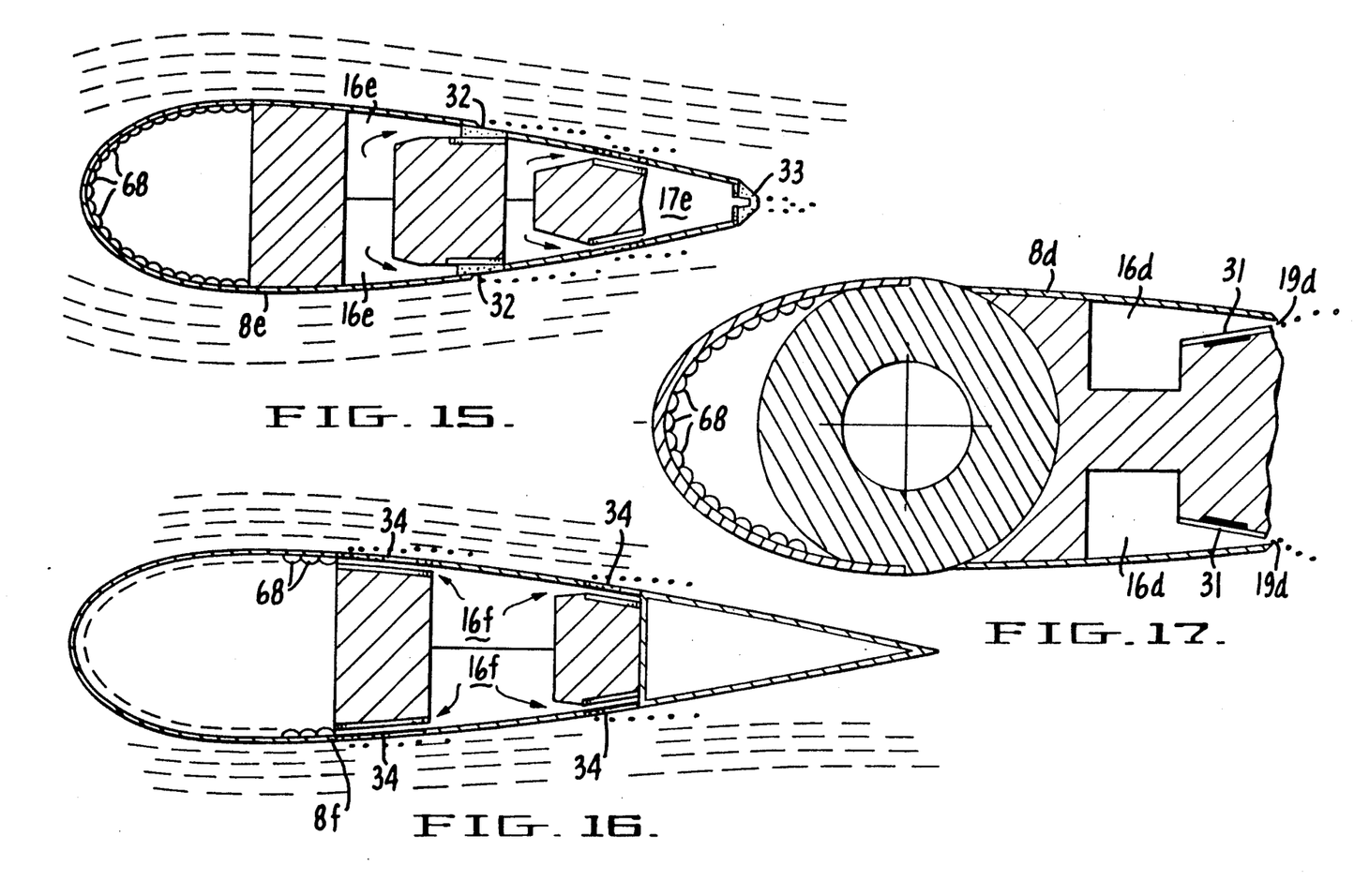
FIG. 15 is a cross-sectional view across the chord direction of a foil showing diffuser plates mounted therein in accordance with one embodiment of this invention.
FIG. 16 is a cross-sectional view across the chord direction of a foil having diffuser plates mounted therein in accordance with another embodiment of this invention.
FIG. 17 is a cross-sectional view of a foil showing internal diffuser plates in accordance with yet another embodiment of this invention.

Referring to FIG. 17, in this embodiment diffuser plates 31 are provided in the interior walls of foil 8d. Compressed air is supplied to the back sides of diffuser plates 31 by means of conduits extending from the foil to a compressed air source in the vessel (not shown). Water is circulated through chambers 16d to carry the bubbles away from diffuser plates 32 and through vertical slit openings 19d into the water streaming past the foil.

In FIG. 15 diffuser plates 32 and plate 33 are mounted in channels 16e and in channel 17e, respectively, to emit bubbles directly into the water stream exteriorly of the foil 8e. In this embodiment channels 16e and channel 17e are charged with pressurized gas to be diffused through diffuser plates 32 and 33.

In FIG. 16, and also as shown in FIGS. 9-11, diffuser plates 34 are mounted in the walls of foil 8f, flush with its surface and in direct communication with the outside. In FIG. 16 plenum chamber 16f is pressurized (by a compressed air source not shown) to create gas flow through diffuser plates 34. Similarly, in FIG. 9 air compressor 35 provides pressurized gas which is fed through conduit 36 to an elongated diffuser plate 37 mounted at the surface of foil 8a. Electrical generator 38 also supplies electrical energy through conduit 39 to foil 8a for purposes which will be described below.

FIGS. 10-14 illustrate gas diffuser systems forming another important feature of this invention. In FIG. 10 discrete diffuser cells 40 located along the surface of foil 8b to provide a thorough distribution of bubbles in the water field in advance of the bow. Either in place of or supplementary to the foil mounted cells, diffuser cells 40 may be located on mounting strut 11b and on hull of vessel 1b, as shown. These cells may be flush mounted and each supplied gas under pressure by piping similarly as shown in detail with respect to the foil embodiment of FIG. 11.

Figure 12:
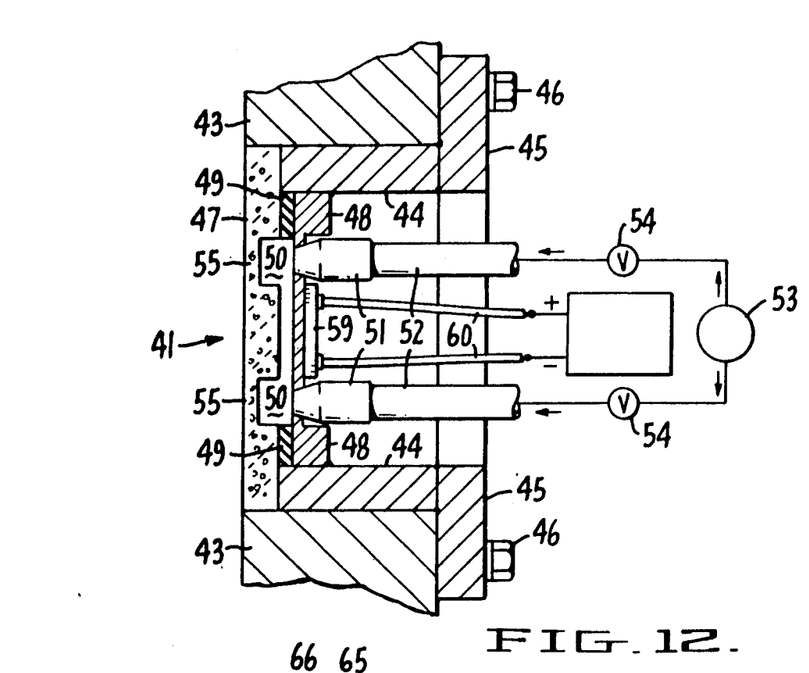
FIG. 12 is a breakaway cross-sectional view of the foil wall of the foil of FIG. 11 showing mounted therein a diffuser cell for microbubble generation in accordance with this invention.
Figure 13:
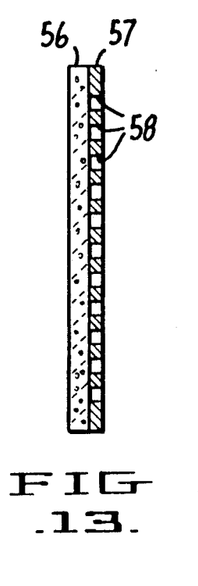
FIG. 13 is a cross-sectional view of an alternative diffuser plate for the diffuser cell depicted in FIG. 12.

Straight sided diffuser cell 41 and round circular diffuser cells 42 in FIG. 11 are flush mounted at the exterior surface of foil 8c. As seen in FIG. 12 cell 41 is mounted in an opening through foil wall 43 with casing 44 of cell 41 engaging the sides of the wall opening. Casing 44 is provided with an inboard flange 45 by which it is secured to the inboard side of the foil wall by bolts 46. Diffuser plate 47 is attached to the outboard margins of casing 44 by welds or the like. The outboard side of diffuser plate 47 is flush with the outboard surface of foil wall 43 and covers the entire wall opening. Backwall 48 is engaged in casing 44 and sealed against diffuser plate 47 by an elastomeric seal 49, to form air chamber 50. Nozzles 52 are mounted on back wall 48 in communication with air chamber 50. Conduits 51 connect nozzles 52 with a compressed air source 53 through valves 54. Diffuser plate 47 is provided with areas of reduced thickness which permit increased flow of gas (at a given pressure) without unduly compromising the strength of the plate, in order to maintain integrity of the hull. An alternative diffuser plate for diffuser cell 41 is depicted in FIG. 13. Diffuser plate 56 is thinner throughout its entire cross-section and structural integrity is provided by backing plate 57 at its inboard surface which serves to reinforce diffuser plate 56 while permitting passage of gas thereto through its openings 58. This combination may replace diffuser plate 47 in cell 41, if desired.

Yet a further important feature of the diffuser cell systems is based of the discovery that impingement of high frequency wave energy on the diffuser plates surprisingly enhances the throughput of gas, thereby materially improving their efficiency in bubble production. High frequency wave energy utilized is, in general, between one kilohertz and one megahertz, and preferably in the range of 10 to 90 kilohertz. Placement of the wave generator preferably an electroacoustic or electromechanical transducer, relative to the diffuser plate is not critical so long as the energy directly impinges on the plate (through an air gap) or is conducted to the plate through structure adjacent or in contact therewith. In addition to enhancing gas diffusion through the diffuser plate, the wave energy also serves the important function of cleaning the diffuser plate of biological matter and other fouling that occurs in a marine environment.

Again referring to FIG. 12, transducer 59, a piezoelectric crystal with a natural frequency of 50 kilohertz secured to metallized layer electrodes for activation, available from Vernitron Corp., is secured to the inboard surface of back wall 48 which acts as a conductor of the wave energy from the transducer to air chamber 50. Transducer 59 is connected through wires 60 with a high voltage piezoelectric transducer driver(not shown) capable of 320 volt(peak) to generate an output through the frequency range of 10 KHz to 100 KHz.

Figure 14:
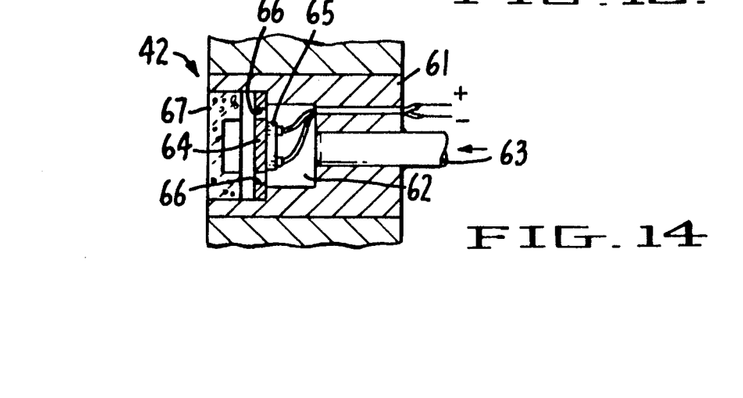
FIG. 14 is a breakaway cross-sectional view of the foil of FIG. 11 taken along line 14—14 showing mounted therein another embodiment of a diffuser cell in accordance with this invention.

Diffuser cell 42 of FIG. 14 is constructed essentially as cell 41 of FIG. 12, except that diffuser cell 42 is circular and its casing 61 has an integral back wall which bounds air chamber 62 and communicates with conduit 63 supplying gas under pressure to air chamber 62. Aluminium support plate 64 is mounted in air chamber 62 for supporting and conducting wave energy from piezoelectric transducer 65 secured thereto. Support plate 64 contains openings 66 therethrough for passage of gas through chamber 62 to diffuser plate 67.

The foregoing diffuser cells are useful for either original installations or for retrofitting foil or vessel, particularly circular cells, as described having a cross-sectional area of effective diffuser surface of between 2 and 10 square inches. For example two inch diameter circular cells may be distributed along the vessel hull and foil, as depicted, to achieve efficient and effective coverage.

The flow rate from the various gas diffuser systems described may be adjusted for the particular speed of the vessel and other conditions, by regulating the gas pressure supplied to the back side of the plate so as to provide a flow of bubbles which, will remain adjacent the wetted surface of the vessel a substantial distance, desirably to midships.

Yet another aspect of the invention is shown in FIGS. 15-17. Electric resistance heating strips 68 are secured to the inner surface of the leading sections 12d, 12e and 12f of foils 8d, 8e and 8f respectively, and extend along the span thereof. Electrical conduits (not shown) connect from a power source on the vessel to heating strips 68. Heating strips 68 heat the foil surfaces which, in turn, heat the water passing the foil to decrease water viscosity. This lowers the frictional resistance of the water not only on the foil surfaces but also on the wetted surface of the bow as the warmed water reaches those surfaces. Another mode of heating the foil surfaces is shown in FIGS. 5-8. Rudder stock 13 and rudder 15 have vertical channels 69 and 70, respectively. These channels may be utilized to heat the surfaces of leading section 12 by circulating heating media through them. Heating media, such as hot water, may be piped to the upper end of rudder channel 70, circulated to rudder stock channel 69 at the lower end through connector pipe 71 and then removed at the upper end of channel 69 and piped back to vessel 1 for heating.

Yet another feature of these invention relating to the use of the bow foil is illustrated in FIG. 18. To further promote streamline flow of the water passing the foil and bow and to prevent turbulene, water may be drawn into the foil. For this purpose foil 8i is provided with the capability of drawing in water at or in the vicinity of the trailing edge. Specifically, water is drawn in through slot 72 connecting with conduit 73 extending from the foil through the bottom strut into the bow of vessel 1i. Pump 74 draws the water into slot 72 and through conduit 74 and then expels the water through an extension of conduit 73 extending below keel line 3i of the bow.

I claim:

1. A vessel of improved performance capability having at least one hull with a tapered bow which comprises, in combination therewith, means positioned forward of a portion of the bowpeak of said bow below the waterline and along the vertical longitudinal center plane of the hull for and capable of imparting momentum to the water forward of said bowpeak portion in the outboard direction on each side of said plane while maintaining said water in streamline flow as the bow of the hull moves therepast, said means comprising a foil spaced forwardly of said bow peak portion with the trailing edge thereof confronting said bowpeak portion in the fore-and-aft direction of said hull, said foil being elongated generally in the direction along said bowpeak portion, in proportion to the width of the foil in the fore-and-aft direction of the vessel, and being elongated in said fore-and-aft direction, in proportion to the thickness of the foil transverse to said vertical longitudinal center plane, and an aftward portion of the trailing section of said foil being generally tapered in the fore-and-aft direction to said trailing edge.

2. A method of decreasing friction and turbulence on the wetted surface of a vessel having a hull with a tapered bow as it moves through water which comprises positioning forward of a portion of the bowpeak of the said bow below its waterline means for imparting momentum to the water forward of said bowpeak portion in the outboard direction on each side of said plane while maintaining said water in streamline flow as the vessel bow moves therepast, said means comprising a foil spaced forwardly of said bowpeak portion with the trailing edge thereof confronting said bowpeak portion in the fore-and-aft direction of said hull, said foil being elongated generally in the direction along said bowpeak portion, in proportion to the width of the foil in the fore-and-aft direction of the vessel, and being elongated in said fore-and-aft direction, in proportion to the thickness of the foil transverse to said fore-and-aft direction, and an aftward portion of the trailing section of said foil being generally tapered in the fore-and-aft direction to said trailing edge, and moving said means forward in the path of said hull at the same speed as the hull to maintain the aforesaid positioning as the vessel hull moves through the water.

3. A method as in claim 2 and wherein friction reducing agents are dispensed from said foil into the water forward of said bowpeak portion.

4. A vessel of improved performance capability having a hull with a tapered bow, said hull having a foil forward of at least a portion of the bowpeak of said bow below the waterline of the hull and positioned with its trailing edge spaced forward of and confronting said bowpeak portion with the trailing edge thereof confronting said bowpeak portion in the fore-and-aft direction of said hull, said foil being elongated generally in the direction along said bowpeak portion, in proportion to the width of the foil in the fore-and-aft direction, and being elongated in the fore-and-aft direction, in proportion to the thickness of the foil transverse to the foreand-aft direction and an aftward portion of the trailing section of said foil being generally tapered in the fore-and-aft direction to said trailing edge.

5. A vessel as in claim 4 and wherein the thickness of said foil at the thickest point along the chord thereof is between 1% and 40% of the chord length and said point of maximum thickness is aft of the leading edge of said foil a distance equal to between 20% and 80% of the chord length.

6. A vessel as in claim 5 and wherein said foil has a flow passage extending between the two fore-and-aft sides thereof and located aft of the leading edge of the foil and forward of the trailing edge thereof and diverter means extendable into the flow on at least one side of the foil for diverting flow through said passage from one side of the foil to the other when said passage is open.

7. A vessel as in claim 6 and wherein the leading edge of said passage extends generally in the span direction of said foil and said passage terminates, at its aftmost point, a distance forward of the trailing edge of the foil adjacent thereto a distance equal to or greater than 20% of the chord length of the foil at said passage, said diverter means constitutes a flow diverter positioned in said flow passage to at least partially close said passage and movable from said closed position to an open position extending outwardly of the surface of said foil into the path of flow adjacent thereto, said diverter being mounted for pivoting on a pivot located intermediate the leading and trailing edges of said diverter and extending generally in the span direction of said foil, whereby when the leading edge of said diverter is pivoted to an open position extending into the path of flow on one side of said foil, the trailing edge of said diverter pivots to an open position extending into the path of flow on the other side of the foil.

8. A vessel as in claim 5 and wherein said foil has a substantially equal and continuous camber on both surfaces thereof, said thickest point of said foil along the chord is aft of the leading edge thereof a distance equal to between 20% and 60% of the chord length and said foil is secured to the bow of the hull.

9. A vessel as in claim 4 and wherein said foil has a forward rake.

10. A vessel as in claim 9 and wherein the trailing edge of said foil is generally parallel with the bowpeak.

11. A vessel as in claim 9 and wherein said foil extends from the waterline of the vessel downward a substantial distance towards the keel line and is fixed to the bow of the hull and supported thereby.

12. A vessel as in claim 4 and wherein said bow is tapered to a generally acute angle and said foli is positioned with its trailing edge spaced a distance of between 1% and 30% of the beam width of the vessel forward of said bowpeak portion.

13. A vessel as in claim 12 and wherein the thickness of said foil at the thickest point along the chord thereof is between 1% and 40% of the chord length and said point of maximum thickness is aft of the leading edge of said foil a distance equal to between 20% and 80% of the chord length.

14. A vessel as in claim 13 and wherein said foil has a substantially equal and continuous camber on both surfaces thereof, said foil extends from the waterline of the hull downward a substantial distance towards the keel line and said foil is secured to the bow of the hull.

15. A vessel as in claim 4 and including means for drawing water into the foil at the trailing edge thereof comprising one or more openings along the trailing edge means for expelling said water from the foil at a location remote from said trailing edge.

16. A vessel of improved performance capability having a hull with a tapered bow, said hull having a foil forward of at least a portion of the bowpeak of said bow below the waterline of the hull and positioned with its trailing edge spaced forward of said bowpeak portion, said foil being elongated generally in the direction along said bowpeak portion, in proportion to the width of the foil in the fore-and-aft direction, being elongated in the fore-and-aft direction, in proportion to the thickness of the foil transverse to the fore-and-aft direction, being generally tapered in the chord direction to the leading edge and to the trailing edge, respectively, and having a substantially neutral profile, said foil being positioned with the chord thereof substantially coincident with the vertical longitudinal center plane of said hull, said trailing edge thereof spaced from said bowpeak portion horizontally a distance greater than the maximum thickness of the foil transverse to said chord.

17. A vessel as in claim 16 and wherein the thickness of said foil at the thickest point along the chord thereof is between 1% and 40% of the chord length and said point of maximum thickness is aft of the leading edge of said foil a distance equal to between 20% and 80% of the chord length.

18. A vessel as in claim 17 and wherein said foil has a flow passage extending between the two fore-and-aft sides thereof and located aft of the leading edge of the foil and forward of the trailing edge thereof and diverter means extendable into the flow on at least one side of the foil for diverting flow through said passage from one side of the foil to the other when said passage is open.

19. A vessel as in claim 18 and wherein the leading edge of said passage extends generally in the span direction of said foil and said passage terminates, at its aftmost point, a distance forward of the trailing edge of the foil adjacent thereto a distance equal to or greater than 20% of the chord length of the foil at said passage, said diverter means constitutes a flow diverter positioned in said flow passage to at least partially close said passage and movable from said closed position to an open position extending outwardly of the surface of said foil into the path of flow adjacent thereto, said diverter being mounted for pivoting on a pivot located intermediate the leading and trailing edges of said diverter and extending generally in the span direction of said foil, whereby, when the leading edge of said diverter is pivoted to an open position extending into the path of flow on one side of said foil, the trailing edge of said diverter pivots to an open position extending into the path of flow on the other side of the foil.

20. A vessel as in claim 17 and wherein the thickness of the foil at the thickest point along the chord is between one half and sixty inches and said thickest point is aft of the leading edge thereof a distance equal to between 20% and 60% of the chord length.

21. A vessel as in claim 20, and wherein said foil has a substantially equal and continuous camber on both surfaces thereof, said foil extends from the waterline of the hull downward a substantial distance towards the keel line and said foil is secured to the bow of the hull.

22. A vessel as in claim 16 and wherein said foil has a forward rake and the trailing edge thereof is generally parallel with said bowpeak portion.

23. A vessel having a hull of improved performance capability, said hull having a foil forward of at least a portion of the bowpeak below the waterline of the vessel and positioned with its trailing edge spaced forward of and confronting, in the fore-and-aft direction of said hull, said bowpeak portion, said foil being elongated generally in the direction along said bowpeak portion, in proportion to the width of the foil in the fore-and-aft direction, and being elongated in the fore-and-aft direction, in proportion to the thickness of the foil transverse to the fore-and-aft direction, and said foil having means located thereon for dispensing friction reducing agents into the path of the bow the vessel.

24. A vessel as in claim 23 and wherein said bow is tapered to a generally acute angle, the thickness of said foil at the thickest point along the chord thereof is between 1% and 40% of the chord length and said point of maximum thickness is aft of the leading edge of said foil a distance equal to between 20% and 80% of the chord length, the trailing edge of said foil is spaced from said bowpeak section a distance between 1% and 30% of the beam width of the hull and said means for dispensing friction reducing agents is located at the trailing section of said foil.

25. A vessel as in claim 23 and wherein said foil has a substantially neutral profile, the chord thereof is substantially coincident with the vertical longitudinal center plane of said hull and the trailing edge thereof is spaced from said bowpeak portion horizontally a distance greater than the maximum thickness of the foil transverse to said chord, said foil is generally tapered in the chord direction to the leading edge and to the trailing edge, respectively, and said means for dispensing friction reducing agents comprises at least one microbubble generating diffuser cell disposed along the span direction of said foil.

26. A vessel as in claim 25 and wherein said diffuser cell is flush mounted at the surface of said foil.

27. A vessel as in claim 23 and wherein said means for dispensing friction reducing agents at said foil comprises at least one diffuser cell for generating gas microbubbles underwater, said cell having an outer wall exposed to contact with water when submerged, a chamber in said cell adapted for receiving gas under pressure and a microporous diffuser mat forming at least a portion of said outer wall with the inner side of said mat in gas flow communication with said chamber, said mat comprising compressed, non-woven metal fibers bonded at crossing points, the average pore diameter of the pores through said mat being between about 5 and 100 microns and the density of said mat being below 70 percent of the density of said fibers.

28. A foil as in claim 27 and wherein said diffuser cell includes, in wave energy impinging relationship to said mat, means for generating wave energy having a frequency of at least one kilohertz.

29. A foil useful for improving the performance of a vessel when positioned forwardly of the bow of the vessel, said foil having a substantially neutral profile in the chord direction thereof, being elongated in a span direction generally transverse to the chord direction thereof, in proportion to the chord length of the foil and being generally tapered in the chord direction to the leading edge and to the trailing edge, respectively, the thickness of said foil at the thickest point along the chord thereof being between 1% and 40% of the chord length and said point of maximum thickness of said foil being aft of the leading edge thereof a distance equal to between 20% and 80% of the chord length, and said foil having microbubble generating and dispensing means comprised of a diffuser cell, said cell having an outer wall exposed to contact with water when submerged, a chamber in said cell adapted for receiving gas under pressure and a microporous diffuser mat forming at least a portion of said outer wall with the inner side of said mat in gas flow communication with said chamber, said mat comprising compressed, non-woven metal fibers bonded at crossing points, the average pore diameter of the pores through said mat being between about 5 and 100 microns and the density of said mat being below 70 percent of the density of said fibers.

30. A foil as in claim 29 and wherein said microporous barrier is located at the surface thereof in the direction of the trailing edge from the thickest point along the chord thereof.

31. A foil as in claim 30 and wherein said microporous barrier is disposed along the span direction of said foil.

32. A foil as in claim 29 and wherein said diffuser cell includes, in wave energy impinging relationship to said mat, means for generating wave energy having a frequency of at least one kilohertz.

33. A vessel having a foil mounted at each side of the hull between the keel line and the water line of the hull with span direction of each foil extending generally outboard of said hull, with the leading edge of each said foil extending in the forward direction and with the chord of each foil being generally horizontal and wherein each said foil has a flow passage extending between the two sides thereof and located aft of the leading edge of the foil and forward of the trailing edge thereof, the leading edge of each said passage extends generally in the span direction of its respective foil, a flow diverter positioned in each said flow passage and mounted for pivoting on a pivot extending generally in the span direction of the foil, each said diverter being capable in a closed position of at least partially closing said passage and being pivotable about its said pivot from the closed position, selectively, to an open position with a leading portion of said diverter extending outwardly of the surface of the foil to one side thereof into the path of flow adjacent thereto and to an open position with a leading portion of said diverter extending outwardly of the surface of the foil to the other side thereof into the path of flow adjacent thereto, whereby to divert flow through said passage from the selected side of the foil to the other other, and means for pivoting the diverter on one of said foils to an open position with the leading portion of said diverter extending outwardly of the upper surface of said one foil and, concurrently, pivoting the diverter on the other said foils to an open position with the leading portion of said diverter extending outwardly of the lower surface of said second foil, whereby to create a force on each foil normal to the chord thereof in the same rotational direction about the longitudinal axis of the vessel to counter roll of the vessel in the opposite rotational direction.

34. A vessel as in claim 33 and wherein each said foil is fixedly, non-pivotably mounted at the side of said hull.

35. A vessel as in claim 33 and wherein each said passage is located forward of the trailing edge of the foil adjacent said passage a distance equal to or greater than 20% of the chord length of the foil at said passage and said pivot is located intermediate the leading and trailing edges of its respective diverter and, when each said diverter is in an open position with a leading section of its respective diverter extended outwardly of the surface of its respective foil to one side thereof, a trailing section of said diverter is extended outwardly of the surface of said foil to the other side thereof and into the path of flow adjacent thereto.

36. A vessel as in claim 35 and wherein each said foil is fixedly, non-pivotably mounted at the side of said hull.

37. A vessel as in claim 23 and said hull having a bow tapered to a generally acute angle, said trailing edge of said foil spaced forward of said bowpeak portion horizontally a distance greater than the maximum thickness of the foil transverse to said chord, the chord of said foil being substantially coincident with the vertical longitudinal center plane of said hull, said foil being generally tapered in the chord direction to the leading edge and to the trailing edge, respectively, the thickness of said foil at the thickest point along the chord thereof being between 1% and 40% of the chord length and said point of maximum thickness being aft of the leading edge of said foil a distance equal to between 20% and 80% of the chord length, and said means for dispensing friction reducing agents comprising means for generating and dispensing microbubbles into the path of the bow of the hull.

* * * * *